(12) United States Patent
Feldman

(10) Patent No.: US 8,098,922 B2
(45) Date of Patent: Jan. 17, 2012

(54) SELECTIVE IMAGING OF DATA PRINTED ON FINANCIAL INSTRUMENTS

(75) Inventor: John G. Feldman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 1238 days.

(21) Appl. No.: 11/669,743

(22) Filed: Jan. 31, 2007

(65) Prior Publication Data

US 2008/0180750 A1 Jul. 31, 2008

(51) Int. Cl.
G06K 9/00 (2006.01)
(52) U.S. Cl. ......................................... 382/137; 382/306
(58) Field of Classification Search .................. 382/137, 382/232, 283, 306; 358/401, 405, 487, 506; 358/3.28; 707/E17.023; 283/57, 58, 70, 283/93; 355/27, 40; 399/82, 85; 235/379, 235/375; 705/44, 45
See application file for complete search history.

(56) References Cited

U.S. PATENT DOCUMENTS

| | | | |
|---|---|---|---|
| 4,258,644 A | | 3/1981 | Goettert et al. ............. 118/31.5 |
| 5,644,352 A | | 7/1997 | Chang et al. ................... 347/221 |
| 5,668,897 A | * | 9/1997 | Stolfo ............................ 382/283 |
| 5,704,651 A | * | 1/1998 | Phillips ............................ 283/93 |
| 5,748,780 A | * | 5/1998 | Stolfo ............................ 382/232 |
| 5,873,604 A | * | 2/1999 | Phillips ............................ 283/70 |
| 6,564,996 B2 | * | 5/2003 | Hoffman et al. .............. 235/379 |
| 6,574,377 B1 | | 6/2003 | Cahill et al. .................. 382/305 |
| 7,104,709 B1 | | 9/2006 | Maher et al. .................... 400/76 |
| 2005/0021466 A1 | | 1/2005 | Buchanan et al. .............. 705/45 |
| 2005/0125339 A1 | | 6/2005 | Tidwell et al. ................ 235/440 |
| 2005/0163362 A1 | | 7/2005 | Jones et al. .................... 382/135 |
| 2006/0278724 A1 | | 12/2006 | Walker et al. ................. 235/494 |

OTHER PUBLICATIONS

PCT International Search Report, PCT/US2008/52347, May 27, 2009, 2 pages.
PCT Written Opinion of the International Searching Authority, May 27, 2009, 5 pages.
Office Action dated Feb. 28, 2011 in corresponding New Zealand patent application No. 578949 (2 pages).

* cited by examiner

Primary Examiner — Anh Hong Do
(74) Attorney, Agent, or Firm — Fish & Richardson P.C.

(57) ABSTRACT

Systems and processes for processing financial instruments include receiving a physical financial instrument, printing data on the received physical financial instrument, and capturing an image of the physical financial instrument to produce an electronic image. At least a portion of the data printed on the physical financial instrument is printed in a manner that substantially precludes reproduction in the electronic image. The electronic image is transmitted across a network, for example, to perform electronic processing, such as posting or clearing.

20 Claims, 5 Drawing Sheets

SELECTIVE IMAGING OF DATA PRINTED ON FINANCIAL INSTRUMENTS

TECHNICAL FIELD

This description relates to document imaging, and more particularly to selective imaging of data printed on financial instruments.

BACKGROUND

Checks are typically deposited at a bank of first deposit where the check payee maintains a bank account. Checks may be deposited individually or in groups, but are generally assembled into bundles for delivery to the bank's check processing facilities. In processing the checks, bundles of checks are first put through a keying and balancing process, in which the check amounts are read from the checks automatically and/or manually and printed (e.g., encoded) onto the check in MICR format and ink. In addition, totals of checks for each bundle are calculated and balanced against the amount for the received bundle to test for errors. The checks are then sorted, typically according to destination, and forwarded for clearing. In some cases, electronic data, such as images and MICR data, is collected for archiving and/or for use in electronic clearing.

SUMMARY

Techniques can be implemented for printing data on checks during processing such that some data is visible in images taken of the checks as well as on the physical checks themselves, while other data is visible on the physical check but not in captured images of the checks.

In one general aspect, financial instruments are processed by receiving a physical financial instrument, printing data on the received physical financial instrument, capturing an image of the physical financial instrument to produce an electronic image, and transmitting the electronic image across a network. At least a portion of the data printed on the physical financial instrument is printed in a manner that substantially precludes reproduction in the electronic image.

Implementations can include one or more of the following features. The data is printed using a color selected to substantially preclude reproduction. The color is selected from a range of colors visible to a human when printed on a physical financial instrument but that substantially precludes reproduction during capturing of the image. The data is printed using a selected ink, and at least one of the selected ink and a device used for capturing the image are adapted to substantially preclude reproduction of data printed in the selected ink. The selected ink may be an ink having characteristics that substantially precludes reproduction of data printed in the electronic image. The data is printed by printing multiple characters, and each character includes multiple spaced-apart segments. The device used for capturing the image comprises a black-and-white scanner. The physical financial instrument is stored. The physical financial instrument is a check and the data that is printed in a manner that substantially precludes reproduction in the electronic image is a unique sequence number for the check.

In another general aspect, a check processing system includes a transport for processing financial instruments, a printer adapted to print data onto financial instruments fed through the transport, a scanner adapted to capture an image of the financial instruments fed through the transport, and an ink reservoir connected to the printer. The ink reservoir contains ink selected such that data printed with the ink is visible to a human but is substantially non-reproducible when the financial instruments including data printed with the ink are captured by the scanner.

Implementations can include one or more of the following features. A magnetic ink character recognition (MICR) reader is adapted to read MICR data from the financial instruments fed through the transport. The printer is adapted to print a sequence number onto financial instruments fed through the transport using ink from the ink reservoir. A printer is adapted to print endorsement data onto financial instruments fed through the transport using a second ink selected such that data printed with the second ink is substantially reproducible when the financial instruments are captured by the scanner. The second ink is contained in a second ink reservoir. A processor is adapted to receive image data from the scanner.

In yet another general aspect, checks are processed by receiving a physical check for clearing, applying a sequence number onto the physical check using a selected ink such that the sequence number is visible on the physical check, and capturing an image of at least one side of the physical check to produce an electronic image. The selected ink is adapted to substantially preclude capture when capturing the image. The selected ink has a color selected to facilitate substantially precluding capture of data applied onto the physical check using the selected ink. The physical check is one of multiple checks received for clearing. The plurality of physical checks may be sorted, and the electronic image may be transmitted across a network. The physical check is received with a payee's endorsement.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
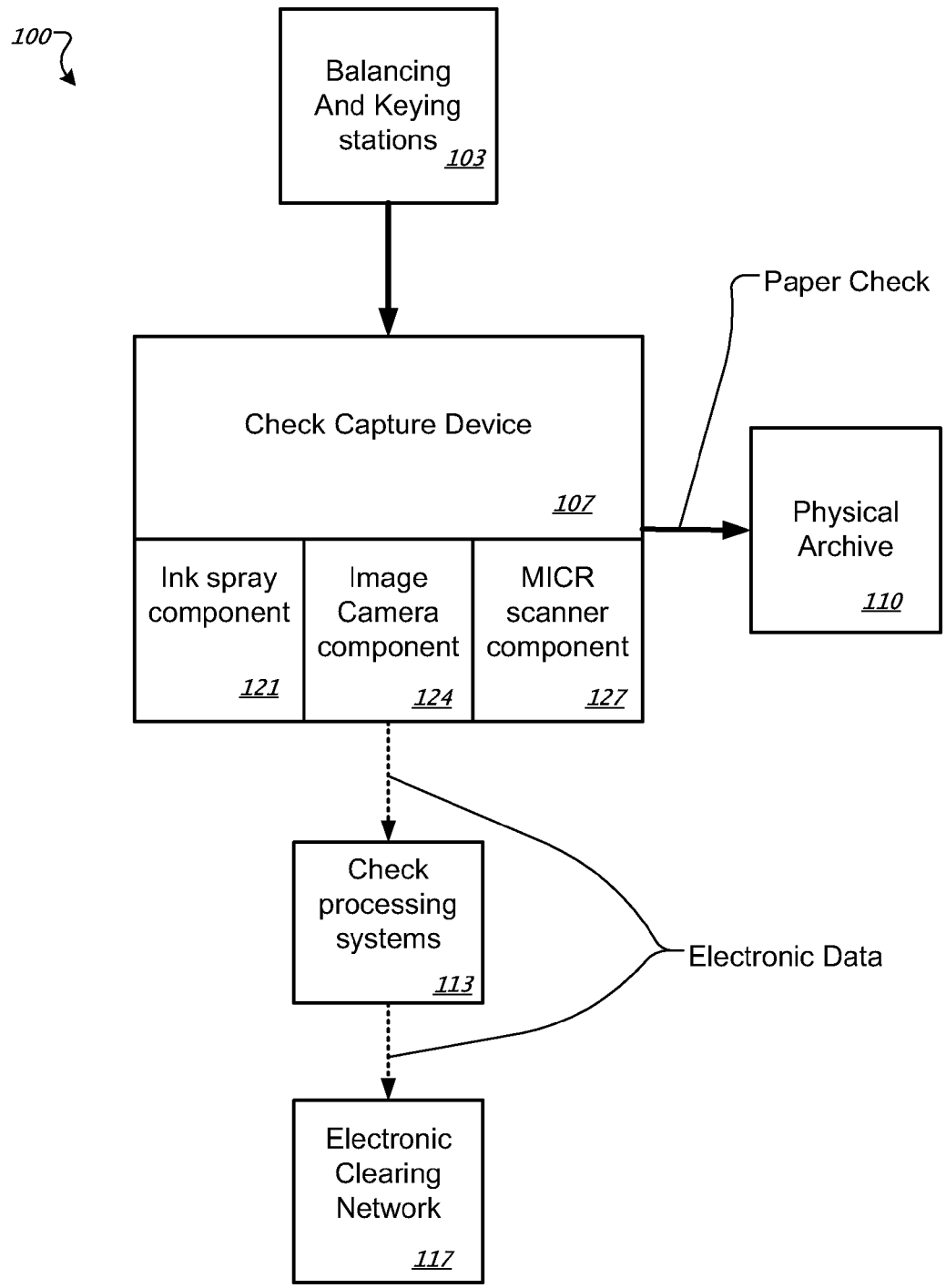
FIG. 1 is a block diagram illustrating an example of a system for processing checks received by a financial institution.

FIG. 1 is a block diagram illustrating an example of a system 100 for processing checks received by a financial institution. The block diagram shows components and systems that can be used by a bank or other financial institution to endorse, track, and clear checks received by the bank. Similar steps can be performed with checks, or the system 100 can also be used to process other financial documents and negotiable instruments, including substitute checks or image replacement documents.

Although the figure is described in the context of checks, the system 100 can be used to process physical financial documents, such as a draft or other negotiable instrument, received at a bank of first deposit or other clearing institution. The financial instrument may be received for clearing, for example, after the instrument has been endorsed by a payee and/or physically deposited at an institution where the payee holds an account. In addition, the system 100 and described processes can be used in the context of other types of documents (e.g., documents not tied to financial transactions).

The system 100 includes one or more balancing and keying stations 103. After passing through the balancing and keying stations 103, checks are sent to a check capture device 107 where information may be printed on and electronic data may be captured from the checks. From the check capture device 107, the physical checks are sent to a physical archive 110, and the electronic data is passed to check posting and clearing systems 113. Processed electronic data is then passed from the check posting and clearing systems 113 to an electronic clearing network 117. In some implementations, instead of sending the paper checks to a physical archive, the paper checks may be used for clearing in addition to or instead of using an electronic clearing network 117.

In the balancing and keying stations 103, operators inspect the check and, in some cases, may enter data from the check, such as its account number, amount, and check number. Bundles of checks received at the balancing and keying stations 103 can be balanced by comparing the total value of checks in the bundle, as indicated on a deposit ticket or other paper or electronic summary document associated with the bundle, with the sum total of the individual checks based on amounts entered via the keying stations. Bundles whose sums total match the corresponding keying station sums can be passed to the check capture device 107. Bundles whose sum totals do not match can be re-keyed, rebalanced, or other appropriate action(s) may be taken, after which the bundles can be passed to the check capture device 107.

The check capture device 107 prints an endorsement and unique identifier or sequence number on the checks received from the balancing and keying stations 103 and captures check images and MICR data. The check capture device 107 can be a sorter that includes an ink spray component 121, an image camera component 124, and a magnetic ink character recognition (MICR) scanner component 127. The ink spray component 121 prints an endorsement (e.g., the clearing bank's endorsement data) and sequence number or other unique identifier on the checks. The sequence number may identify, for example, the date and a unique document identifier that enables each check or other document to be located in the physical archive 110. The image camera component 124 obtains electronic images of the checks. The MICR scanner component 127 obtains data such as the institution routing number, account number, and check number, and amount encoded from on the checks that are encoded with magnetic ink. The physical checks are then sent to the archive 110 where they may be indexed and organized for subsequent retrieval. The electronic images and MICR data corresponding to the checks are forwarded to the check posting and clearing systems 113.

The ink spray component 121 prints data on checks passing through the image capture device 107. The ink spray component 121 (or multiple ink spray components) applies selected ink on the checks to form the characters of the endorsement and/or unique identifier sequence number. The ink spray component 127 can be used to apply endorsement data, sequence numbers, or other data onto the checks. Such data may be applied to the front of the check and/or the back of the check and may be printed in a predetermined location and orientation on the check. The check capture device 107 can include more than one ink spray component 121 for printing different types of data and/or for printing data in different locations.

The image camera component 124 captures images of checks passing through the check capture device 107. The captured images are in the form of a digital picture (e.g., a bitmap or JPEG image) that includes at least some, but not necessarily all (e.g., it may not capture watermarks or other background designs), of the original content of the checks, as well as at least some, but not necessarily all, of the data placed on the checks by the ink spray component 107. Some of the data placed on a check by the ink spray component 121 may be visible to a human but not be visible to the image camera component 124, resulting in its omission in the captured image. For example, the endorsement placed on a check by the ink spray component 121 may be visible to humans and the image camera component 124 such that it is visible in captured images. On the other hand, the unique identifier sequence number can be placed on the check by the ink spray component 121 in a different manner (e.g., such as by using a predetermined combination of ink and image capture device) so that it is visible to humans but not the image camera component 124, resulting in the unique identifier sequence number being omitted in captured images.

The MICR scanner component 127 can be used to scan and obtain information from checks. Such information may include account number, bank ID, check number, and amount. MICR information is typically encoded on checks with magnetic ink that can be read out using MICR scanners.

Electronic images and/or MICR information from checks obtained by the check capture device 107 are passed to the check posting and clearing systems 113. The check posting and clearing systems 113 can be used to perform any number of processing operations on the check information. In some cases, these processing operations may include transferring monetary credit from one bank account to another within the bank. In other cases, checks may require the use of a clearing network to settle accounts. In the latter case, the check amount may be posted or credited to the check payee's account, possibly in accordance with some type of posting schedule (e.g., at the end of the day, after a two day hold, or after funds for the check are received through the Federal Reserve Bank), and the electronic data may be prepared for any of a number of clearing mechanisms. Other processing can also be performed, such as fraud detection, archiving of electronic data and images, printing of image statements, making electronic images available for client retrieval, and the like.

Electronic data is passed from the check posting and clearing systems 113 to an electronic clearing network 117. The electronic clearing network 117 facilitate transaction interchange among multiple banks or other financial institutions and may be provided by, e.g., the Federal Reserve System, the National Clearing House Association, or The Clearing House.

Although the check capture device 107 is depicted as including an ink spray component 121, e.g. an ink jet printer, other technologies can be used to affix the data to the check. For example laser printers utilizing a selected toner, impact printers (e.g. dot matrix, daisy-wheel, etc), and the like can be used to affix the data to the checks.

To preclude reproduction of selected data applied by the ink spray component 121 in the electronic image, the data printed on the physical financial instrument may be printed using a color that substantially precludes reproduction and yet allows it to remain visible to a human. In addition to or as an alternative to the use of a selected color, the selected ink may have characteristics such as density, type, pigments, or dyes that are selected adjusted to allow information printed with the ink to be visible to humans but substantially not visible to image camera component 124. For example, dot matrix, series of lines, array of elements or shapes, or other configurations designed to reduce the density of the ink may be used to print the data characters.

In some implementations, the image camera component 124 may be a monochrome camera, capable of producing black and white images, for example. The camera may be substantially incapable of sensing light reflected by the ink used in printing the unique sequence number, essentially rendering the unique sequence number invisible to the camera which selectively records information on the text. In other implementations, the device used for capturing the image may be a black-and-white scanner, or other device which captures only a portion of the information printed on the check. In general, any technique can be used that makes the data printed on the check or other financial instrument effectively indecipherable or illegible when captured in an image. Typically, the data does not necessarily need to be incapable of capture but may be designed to avoid capture in combination with the particular capture mechanism used.

In some instances, the method may include transmitting the electronic image may be transmitted across a network connecting the check capture device 107 with the check posting and clearing systems 113 or the check posting and clearing systems 113 with the electronic clearing network 117. In some instances, the electronic image may be encrypted. The sequence number and/or other data may be sent in unencrypted form and/or in a separate transmission, in a manner that permits subsequently reassociation with the electronic image.

Figure 2:
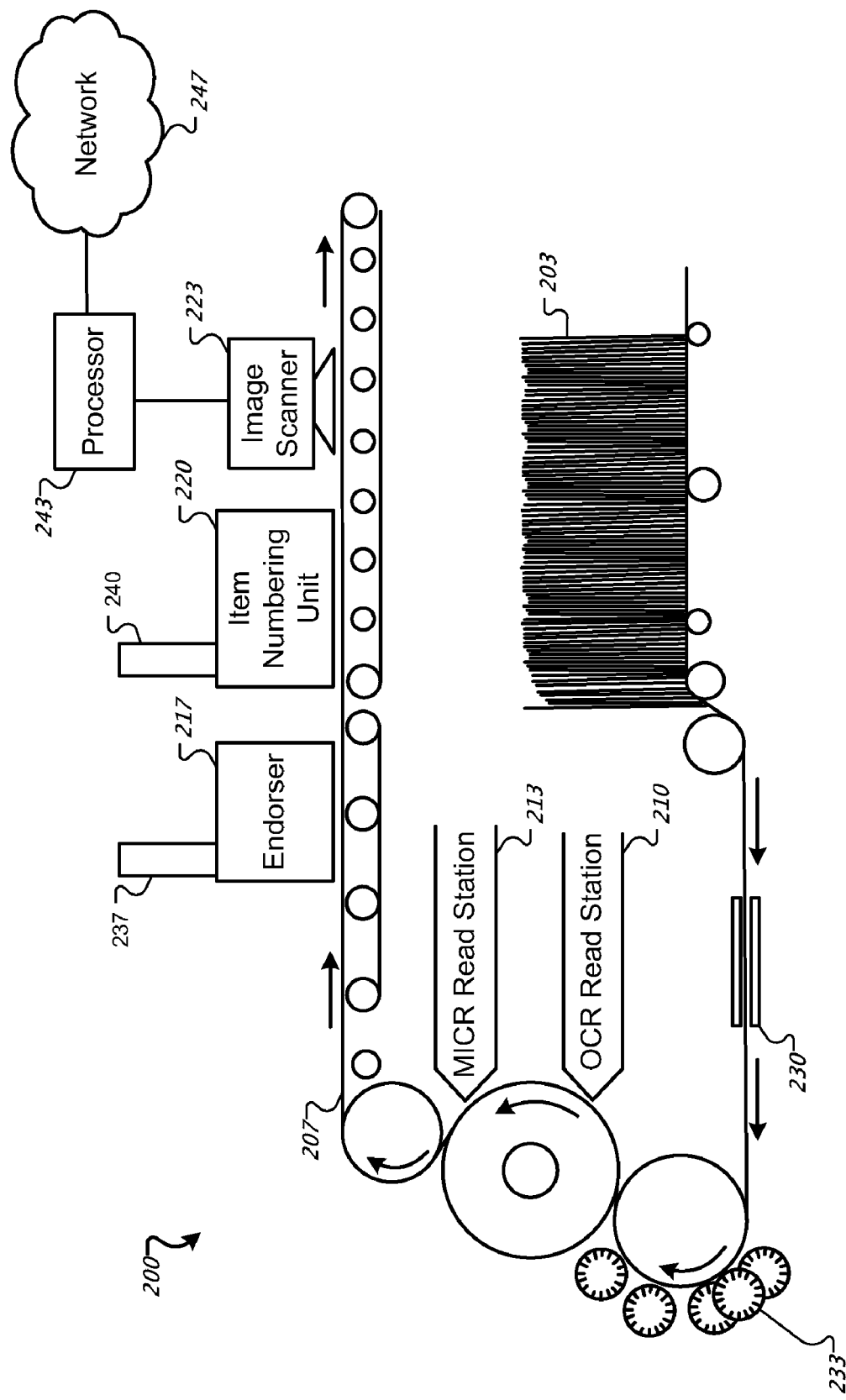
FIG. 2 illustrates an example system for processing checks received by a financial institution.

FIG. 2 illustrates an example system 200 for processing checks received by a financial institution. In general, the system 200 includes a check hopper 203, transport 207, an optical character recognition (OCR) read station 210, a MICR read station 213, an endorser 217, an item numbering unit 220, and an image scanner 223. The hopper 203 holds a stack or bundle of checks to be processed by the system 200. Checks may be carried from the hopper 203 by the transport 207 to the OCR read station 210, the MICR read station 213, the endorser 217, the item numbering unit 220, and the image scanner 223. The OCR read station 210 collects printed information from the check, such as the name of the payee and the amount. The MICR read station 213 collects MICR-encoded information from the checks, such as account number, institution routing number, and check number. The endorser 217 prints endorsement information on the checks, such as the financial institution name in a way that may be both human-readable and machine-readable. The item numbering unit 220 may place a number on the check, such as a sequence number or unique identifier in a manner which is human readable, but not necessarily machine-readable. The image scanner 223 images the checks in a manner that captures information printed by the endorser 217, but not necessarily by the item numbering unit 220. As a result, checks or other financial documents received by a financial institution may be processed such that they have an endorsement placed on the items during processing may be visible while sequence numbers or unique identifiers may not be visible in images captured by the image scanner 223.

The hopper 203 may holds checks or other financial documents which are to be processed by the system 200. Items (shown on-edge in FIG. 2) may be loaded in the hopper 203 such that they are dispensed one at a time and carried through the system by the transport 207. A separator 227 may be used to separate items which are dispensed simultaneously and a multiple document detector 230 may check whether multiple items are separated and processed individually by the system 200; in the event multiple items are detected, an appropriate action may be taken, such as sounding an alarm to alert an operator. The transport 207 may run the items through an alignment station 233 to ensure that they are properly aligned for reading, endorsing, numbering and imaging.

The transport 207 may carry financial instruments from the alignment station 233 to the OCR read station 210. After reading at the OCR station 210, the transport 207 carries the item to the MICR read station 213. The OCR read station 210 extracts text from optical scans of the items; the MICR read station 213 extracts information from the item by sensing various characters on the item formed with magnetic ink as described above.

Items may then be passed from the MICR read station 213 to the endorser 217 by the transport 207. The endorser 217 uses selected ink from a first ink reservoir 237 to print endorsement information on the items carried to it by the transport 207. Items are then carried by the transport 207 to the item numbering unit 220, where an identifier or sequence number may be printed using ink from a second ink reservoir 240. After an identifier or sequence number is placed on an item, the item is passed to the image scanner 223, which takes an image of the item. The image may be an electronic image that is bundled by a processor 243 with other information about the check, such as information extracted from the item while at the OCR read stations 210 and the MICR read station 213 and passed on to other stations within the financial institution via a network 247. For instance, information such as the data extracted at the OCR read station 210, the data extracted at the MICR read station 213, and the information printed on the item at the endorser 217 and item numbering unit 220 (e.g. the check amount, payee, account number, check number, identifier or sequence number etc.) may be forwarded to an accounting workstation for report printing or a sent to a web server for access by an account holder via the Internet upon request. After processing, the physical item may be collected after image scanning and archived at the same facility as the system 200, in another location, or even disposed of.

The first ink reservoir 237, used by the endorser 217, may contain ink selected to allow graphics printed with it to be visible to the human eye and also be visible in images captured by the image scanner 223. Ink in the second ink reservoir 240, used by the item numbering unit, may have ink selected such that graphics printed with it may be visible to the human eye but not be visible in images created by the image scanner 223. The color or other characteristics of the ink used may be selected so as to result in an image that can be viewed with reasonable comfort, e.g., without straining, by a human but be substantially undetectable by the image scanner 223, which may be a typical black-and-white optical scanner or camera used in check or document processing. The image scanner 223 may be configured to capture information printed by the endorser 217 but not (substantially) capture information printed by the item numbering unit 220.

Any printing or labeling technologies may be used which allow capture of the endorsement information without capturing the sequence number or unique identification number used to sequentially number the documents in the system. In some implementations, the endorser 217 or item numbering unit 220 may be an ink-jet printer or similar technology that sprays ink to create graphics, including any characters or symbols used by the system 200. In some implementations, laser printers with selected toners may be used as above where ink is described. In some implementations, printing techniques such as printing with patterns (e.g., dot matrix or other techniques that result in a less dense ink distribution) that are not easily captured by the image scanner 223 may be used.

As shown in FIG. 2 and described above, the system 200 has a endorser 217 and item numbering unit 220. In some implementations the system 200 may have additional printing and/or scanning units which perform some of the functions described above or additional functions not described. In some implementations, several of the units described may be combined; for instance, the functions of the endorser 217 may be combined with the functions of the item numbering unit 220 in a single unit with, for example, multiple reservoirs. Some such implementations may use a single printing apparatus that allows it to separately use ink for endorsement and item numbering functions. Other implementations may use a single printing device and a single ink reservoir that prints both an endorsement and sequence number in a manner that tends to avoid detection by the image scanner 223.

Figure 3A:
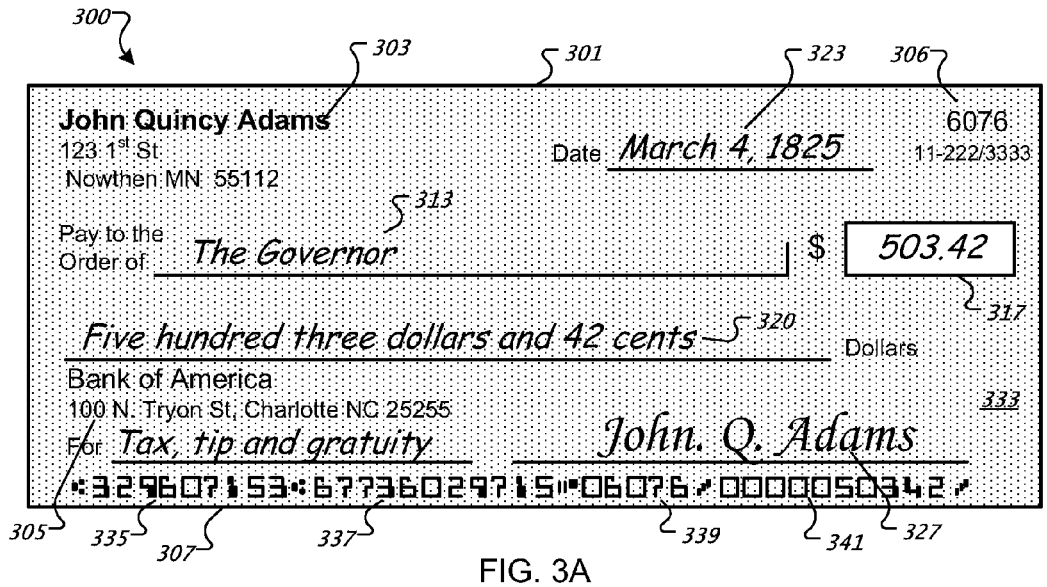
FIGS. 3A and 3B are example illustrations of how the front and back of a check endorsed by a check processing system may appear to a human eye.
Figure 3B:
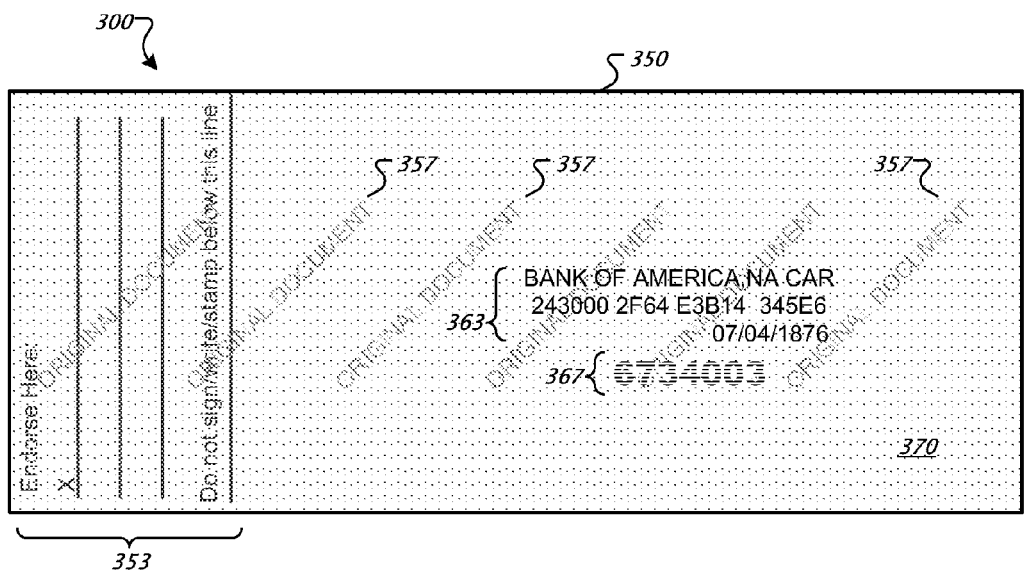

FIGS. 3A-B are illustrations which show how the front and back of an example check may appear to a human eye. FIG. 3A shows the front side 301 of a check 300 which has been filled out by an account holder. FIG. 3B shows the back side 350 of the check 300 after it has been endorsed and numbered by a receiving institution using a check processing system such as the system 200 described above.

The front side 301 of the check 300, shown if FIG. 3A, includes a pre-printed portion and a portion filled out by the account holder. The pre-printed portion includes text identifying the account holder 303, the financial institution 305, check number 306, a MICR string 307, as well as various lines and text describing other information filled in by the account holder. The MICR string consists of characters printed with magnetic ink that encode the financial institution routing number 335, account number 337, and check number 339. The portion filled out by the account holder includes the payee 313, the cash amount written out numerically 317 (e.g., the courtesy amount) and long hand 320 (e.g., the legal amount), a date 323, the payee's signature 327, and an optional note 330. The check front 301 may also include a background pattern 333.

The back side 350 of the check 300, shown if FIG. 3B, has a pre-printed portion and a portion printed by the receiving institution. The pre-printed portion includes a payee endorsement area 353 and security features such as watermarks 357. The portion printed by the receiving institution has an endorsement 363 and a numerical identifier 367. The endorsement area 353 may optionally include a signature of the payee (not shown). The check back 350 may also include a background pattern 370.

Figure 4A:
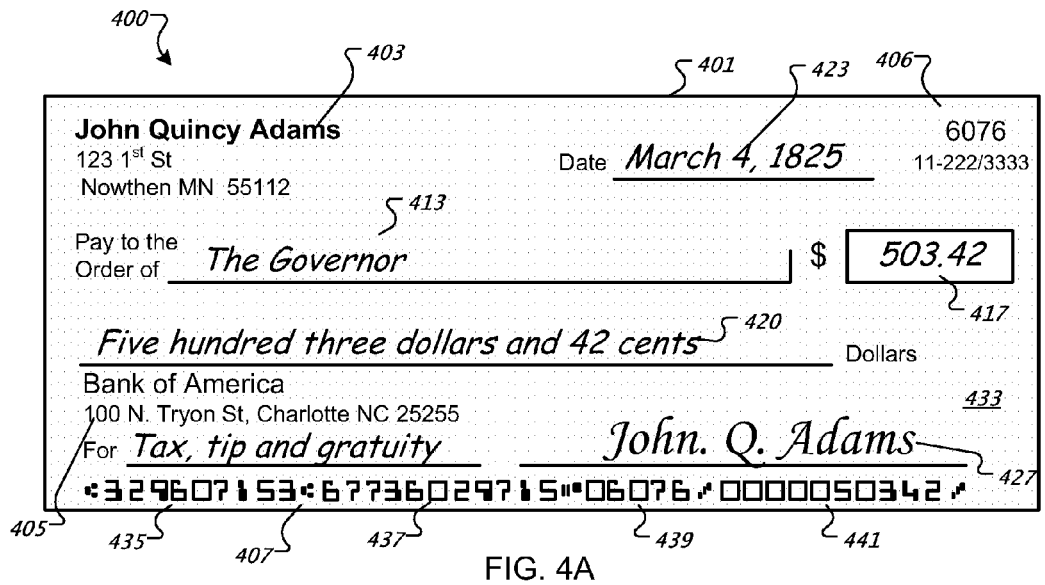
FIGS. 4A and 4B show example front and back scanned images of the check shown in FIGS. 3A and 3B created by the check processing system.
Figure 4B:
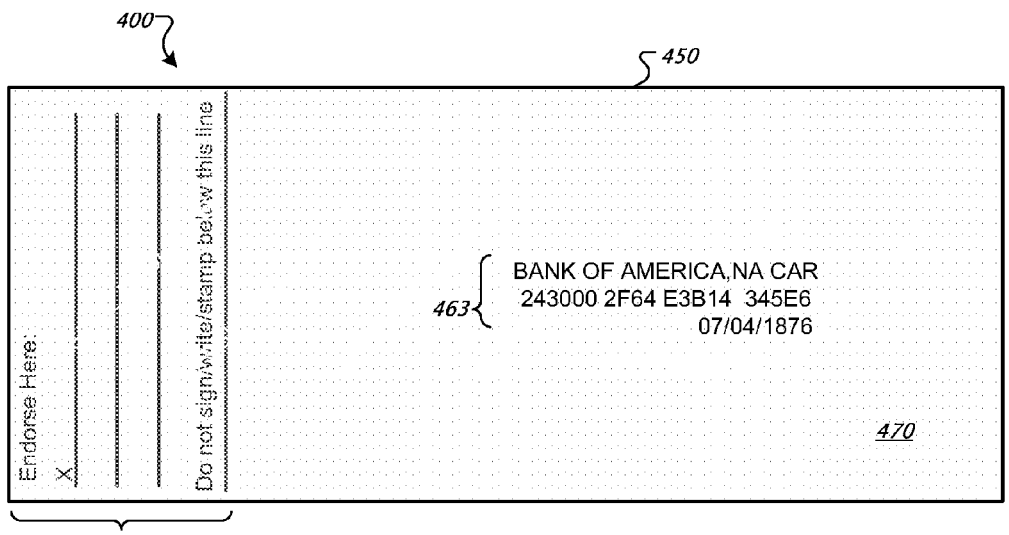

FIGS. 4A-B depict a set 400 of scanned front and back images of the example check shown in FIGS. 3A-B. FIG. 4A depicts the front side 401 of check 300, such as can be produced by image scanner 223. FIG. 4B depicts a scanned image of the back side of the check 300, such as can be produced by image scanner 223.

The various inks used on the front 301 and back 350 of the check 300 may selectively appear in scanned images generated by a check processing system, such as the check processing system 200 described above. FIG. 4A shows how information such as the account holder 403, financial institution 405, check number 406, MICR string 407 (including routing number 435, account number 437, check number 439, and amount 441), payee 413, amounts (417, 420), date 423, and signature 427 appear in the front scanned image 401, while some details such as the background 433 is faint or does not appear.

FIG. 4B shows how information such as the payee endorsement area 353 and receiving institution endorsement 363 appear on the back portion 450 of the captured image set 400 while the background 470 is faint or non-existent. In addition, other items, such as the watermark 375 and numerical identifier 367 in shown on the back 350 of the check 300, do not appear in the scanned image of the back 450; in the case of the numerical identifier 367, this may be due to a combination of ink selection and scanner configuration used in the check and scanner used to create the image set 400 (as described above).

Figure 5:
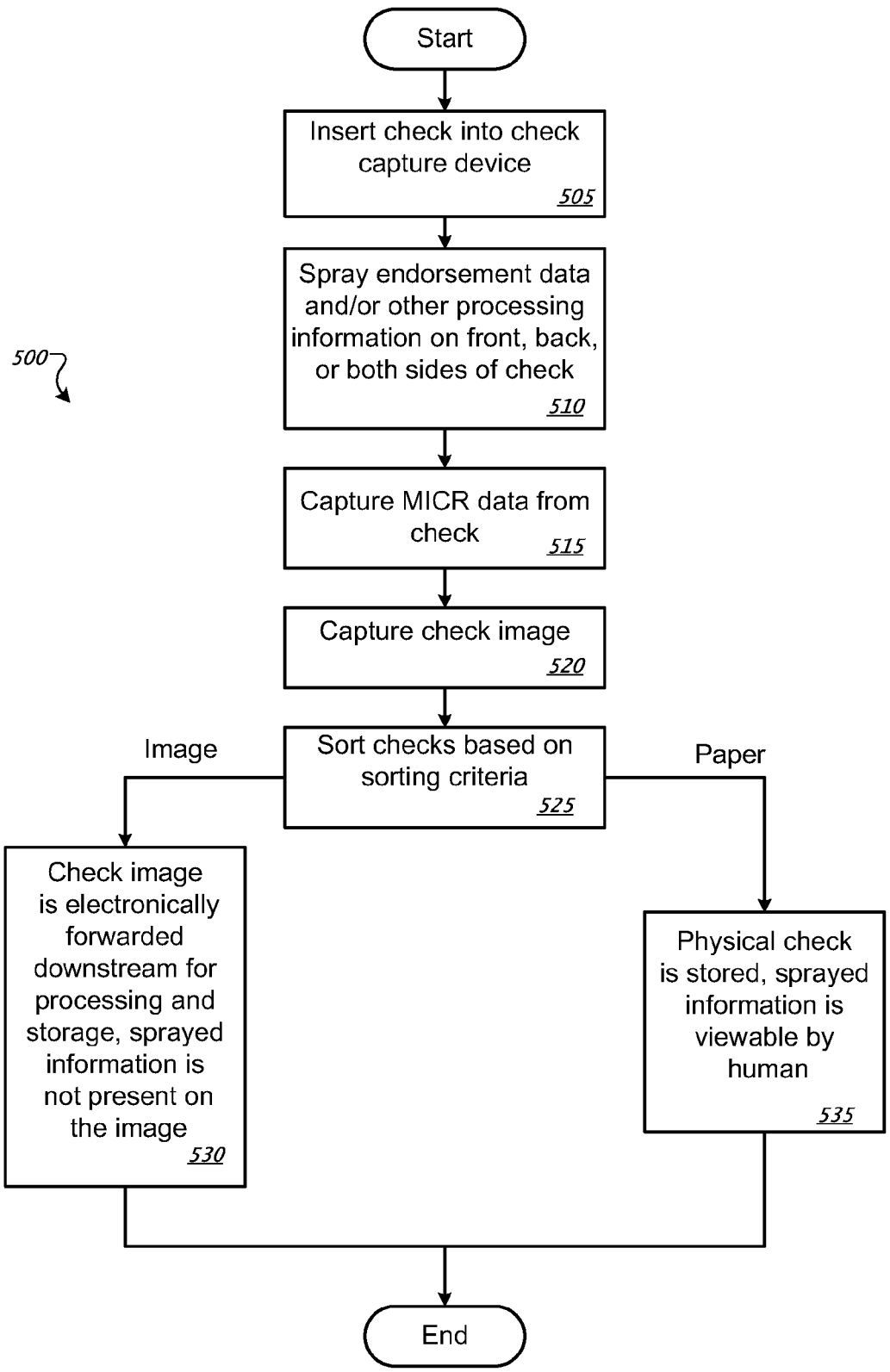
FIG. 5 is an example flow chart showing steps for processing financial documents.
Figure 3A:
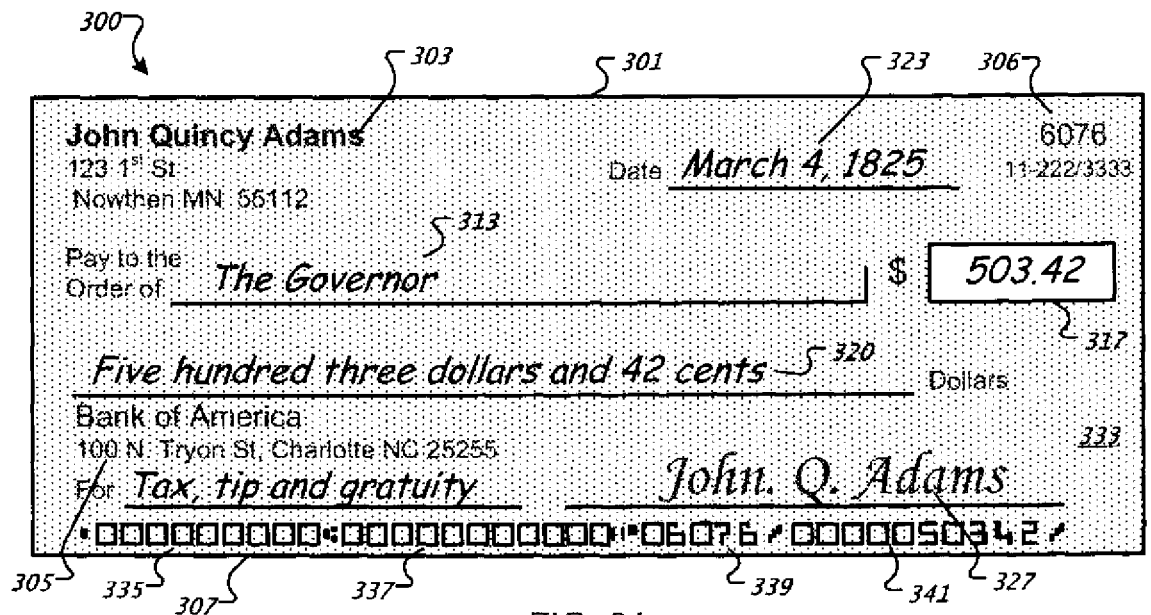
Figure 3B:
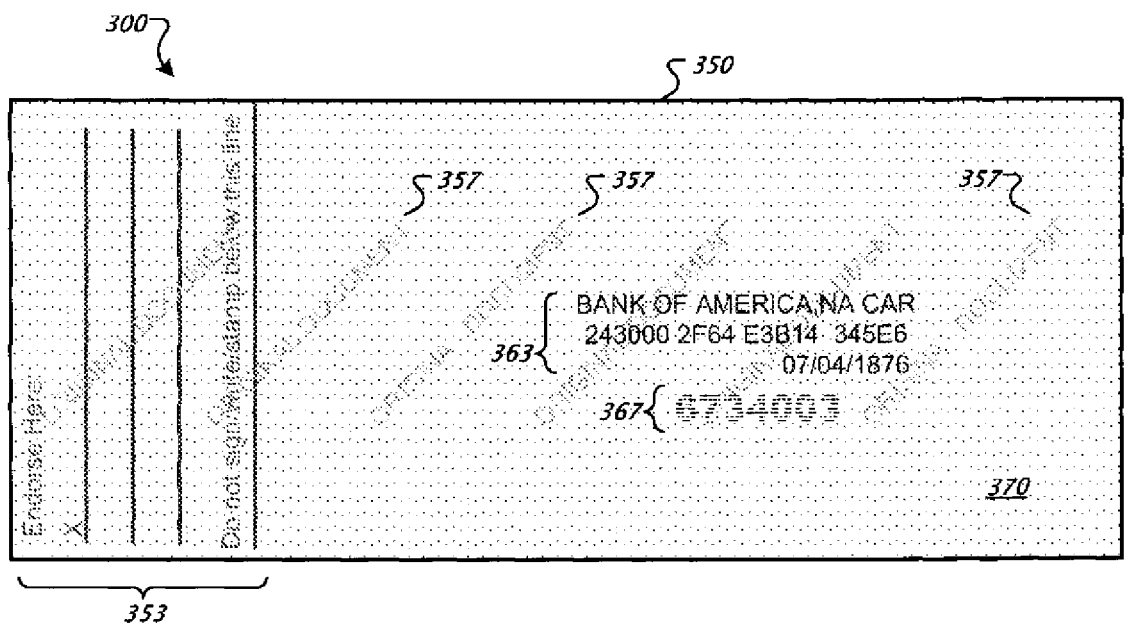

FIG. 5 is an example flow chart showing steps for processing checks. In general, financial documents may be processed by inserting the documents into an image capture device, printing an endorsement, capturing MICR data, capturing an image, sorting based on criteria, forwarding captured and images, and/or storing the physical documents.

As shown in the FIG. 5, a check is initially inserted 505 into a capture device. In some instances, the check may be another type of financial document received by a financial institution such as a bank or credit union.

Endorsement data and/or other processing information is then sprayed 510 on the front, back, or both sides of the check. The endorsement data may include a sequence number that may, in some conditions, not be captured in images of the check, due to selection of particular inks or other printing or spraying techniques. MICR data is then captured 515 from the check. Such data may include routing, account, and uniquely identifying information.

An image is then captured 520 of the check with an image capture device that is capable of selectively capturing the sprayed-on endorsement data. The endorsement data sprayed on the check may have been printed in a differential manner such that causes the sequence number to not appear in captured images even though other endorsement data does appear. In some implementations, the captured MICR data and check image may be in electronic form.

The checks are then sorted 525 based on some predetermined criteria. For example, the checks may be sorted based on the sequence number, the account number, or other data captured from the check. Captured data, which includes the captured image of the check (without the sequence number), can be electronically forwarded 530 to other processes, such as posting, clearing, and storage. Physical checks (e.g. original paper documents) having the printed sequence number(s) that were not captured in the check images, may also be stored 535, temporarily or long-term, in a physical archive.

The ink selected to print the endorsements may include a color selected to substantially preclude its capture from the physical check. Such ink may also be used in conjunction with particular image capture devices or configurations that facilitate capturing portions of the endorsements that are intended to be viewed in captured images while not capturing other portions.

In addition, the steps shown in FIG. 5 may be applied to multiple physical checks received for payment or clearing. In addition to the steps shown, electronic images and/or check data may be sent across a network. For example, the electronic image may be posted to a payee's account, electronically delivered to a retrieval and viewing application, or delivered to subsequent clearing processes.

A number of implementations have been described. Nevertheless, it will be understood that various modifications may be made. For example, although FIGS. 1, 2, and 5 depict or imply a particular sequence of operations, steps or operations may be rearranged or performed in parallel as will be apparent to persons of ordinary skill. Accordingly, other implementations are within the scope of the following claims.

What is claimed is:

1. A method for processing financial instruments, the method comprising:

receiving a negotiable physical financial instrument including information preprinted on the physical financial instrument and information added to convert the preprinted physical financial instrument into a negotiable physical financial instrument;

printing additional data on the received negotiable physical financial instrument after receiving the negotiable physical financial instrument;

capturing an image of the negotiable physical financial instrument to produce an electronic image, wherein at least a portion of the additional data printed on the negotiable physical financial instrument is printed, after receiving the negotiable physical financial instrument, in a manner that substantially precludes reproduction in the electronic image; and transmitting the electronic image across a network.

2. The method of claim 1 wherein printing the data that is printed in a manner that substantially precludes reproduction in the electronic image comprises printing using a color selected to substantially preclude reproduction.

3. The method of claim 2 wherein the color is selected from a range of colors visible to a human when printed on a physical financial instrument but that substantially precludes reproduction during capturing of the image.

4. The method of claim 1 wherein printing the data that is printed in a manner that substantially precludes reproduction in the electronic image comprises printing using a selected ink, wherein at least one of the selected ink and a device used for capturing the image are adapted to substantially preclude reproduction of data printed in the selected ink.

5. The method of claim 4 wherein the selected ink comprises an ink having characteristics that substantially precludes reproduction of data printed in the electronic image.

6. The method of claim 4 wherein printing the data that is printed in a manner that substantially precludes reproduction in the electronic image further comprises printing a plurality of characters, with each character comprising a plurality of spaced-apart segments.

7. The method of claim 4 wherein the device used for capturing the image comprises a black-and-white scanner.

8. The method of claim 1 further comprising storing the negotiable physical financial instrument.

9. The method of claim 1 wherein the negotiable physical financial instrument comprises a check and the data that is printed in a manner that substantially precludes reproduction in the electronic image comprises a unique sequence number for the check.

10. A check processing system comprising:
a transport for processing financial instruments;
a printer adapted to print data onto financial instruments fed through the transport;
a scanner adapted to capture an image of the financial instruments fed through the transport;
an ink reservoir connected to the printer and containing ink selected such that data printed with the ink is visible to a human but is substantially non-reproducible when the financial instruments including data printed with the ink are captured by the scanner.

11. The system of claim 10 further comprising a magnetic ink character recognition (MICR) reader adapted to read MICR data from the financial instruments fed through the transport.

12. The system of claim 10 wherein the printer is adapted to print a sequence number onto financial instruments fed through the transport using ink from the ink reservoir.

13. The system of claim 10 further comprising a printer adapted to print endorsement data onto financial instruments fed through the transport using a second ink selected such that data printed with the second ink is substantially reproducible when the financial instruments are captured by the scanner.

14. The system of claim 13 further comprising a second ink reservoir containing the second ink.

15. The system of claim 10 further comprising a processor adapted to receive image data from the scanner.

16. A method for check processing comprising:
receiving a negotiable physical check for clearing, wherein the negotiable physical check includes preprinted information and information added by a payor to convert the preprinted physical check into the negotiable physical check;
applying a sequence number using a printer onto the negotiable physical check using a selected ink such that the sequence number is visible on the physical check; and
capturing an image of at least one side of the physical check to produce an electronic image, wherein the selected ink is adapted to substantially preclude capture when capturing the image.

17. The method of claim 16 wherein the selected ink comprises a color selected to facilitate substantially precluding capture of data applied onto the physical check using the selected ink.

18. The method of claim 16 wherein the physical check comprises one of a plurality of checks received for payment or clearing.

19. The method of claim 18 further comprising:
sorting the plurality of physical checks; and
transmitting the electronic image across a network.

20. The method of claim 16 wherein the physical check is received with a payee's endorsement.

* * * * *

UNITED STATES PATENT AND TRADEMARK OFFICE
CERTIFICATE OF CORRECTION

PATENT NO. : 8,098,922 B2
APPLICATION NO. : 11/669743
DATED : January 17, 2012
INVENTOR(S) : John G. Feldman It is certified that error appears in the above-identified patent and that said Letters Patent is hereby corrected as shown below:

In Figure 3A, MICR line data 335 and 337 has been amended to replace the original data with data for which it is more evident that the MICR line data is mock data (i.e., a sequence of zeroes). (As shown on attached sheet) In Figure 4A, similar changes have been made to MICR line data 435 and 437.

Signed and Sealed this
Second Day of October, 2012

David J. Kappos
*Director of the United States Patent and Trademark Office*